(12) United States Patent
Lin et al.

(10) Patent No.: US 11,848,802 B2
(45) Date of Patent: Dec. 19, 2023

(54) RECEIVED DATA EQUALIZATION APPARATUS AND METHOD

(71) Applicant: REALTEK SEMICONDUCTOR CORPORATION, Hsinchu (TW)

(72) Inventors: Peng-Fei Lin, Hsinchu (TW);
Chen-Yuan Chang, Hsinchu (TW);
Shih-Chang Chen, Hsinchu (TW)

(73) Assignee: REALTEK SEMICONDUCTOR CORPORATION, Hsinchu (TW)

(\*) Notice: Subject to any disclaimer, the term of this patent is extended or adjusted under 35 U.S.C. 154(b) by 118 days.

(21) Appl. No.: 17/677,177

(22) Filed: Feb. 22, 2022

(65) Prior Publication Data
US 2022/0286326 A1 Sep. 8, 2022

Related U.S. Application Data (60) Provisional application No. 63/156,373, filed on Mar. 4, 2021.

(51) Int. Cl.
*H04L 25/03* (2006.01)
*H04L 25/10* (2006.01)

(52) U.S. Cl.
CPC .. *H04L 25/03044* (2013.01); *H04L 25/03229* (2013.01); *H04L 25/10* (2013.01); *H04L 2025/0377* (2013.01); *H04L 2025/03815* (2013.01)

(58) Field of Classification Search
CPC ......... H04L 25/03006; H04L 25/03019; H04L 25/03044; H04L 25/03229; H04L 25/10; H04L 2025/0377; H04L 2025/03815

USPC .......... 375/229–232, 234, 346, 348
See application file for complete search history.

(56) References Cited

U.S. PATENT DOCUMENTS

| 5,732,112 A | * | 3/1998 | Langberg | ........ H04L 25/03057 375/349 |
| 5,793,821 A | * | 8/1998 | Norrell | ................ H04L 7/0278 375/326 |
| 7,068,593 B2 | * | 6/2006 | Cho | .................... H04L 25/0232 370/208 |

(Continued)

FOREIGN PATENT DOCUMENTS

CN 103780519 B * 1/2017 ........ H04L 25/03114

*Primary Examiner* — Young T. Tse
(74) *Attorney, Agent, or Firm* — WPAT, P.C.

(57) ABSTRACT

The present invention discloses a receive data equalization apparatus. A delay-compensating calculation circuit retrieves training data groups of a training data signal to retrieve total delay amount, generate signed compensation amounts according to a relation among training data contents of training data in each of the training data groups to generate total compensation amount accordingly, and solve equations that correspond total delay amount of the training data groups to the total compensation amount to obtain each of the compensation amounts. A receive data equalization circuit receives the compensation amounts and retrieves a receive data group in a receive data signal, generate signed receive compensation amounts according to a relation among receive data contents of receive data in the receive data group to generate a total receive compensation amount accordingly to perform equalization on a terminal edge of the receive data group according to the total receive compensation amount.

10 Claims, 5 Drawing Sheets

(56) References Cited

U.S. PATENT DOCUMENTS

| | | | |
|---|---|---|---|
| 11,677,597 B2 * | 6/2023 | Fukuzono | ................ H04B 3/10 375/232 |
| 2004/0047410 A1 * | 3/2004 | Choi | ................... H04L 27/0014 375/232 |
| 2021/0399809 A1 * | 12/2021 | Igarashi | .................. H04L 27/20 |

* cited by examiner

RECEIVED DATA EQUALIZATION APPARATUS AND METHOD

BACKGROUND OF THE INVENTION

1. Field of the Invention

The present invention relates to a received data equalization apparatus and a received data equalization method.

2. Description of Related Art

During a transmission process of a transmission signal through a transmission path to a receiver, interference, such as multi-path interference or shadow effect caused by objects on the transmission path, may result in the rise of a received signal error rate.

In order to lower the error rate of the signal transmission of communication system, a channel estimation is required to be performed by the receiver such that a compensation is made according to the channel response generated based on the estimation result to lower the transmission error rate. As a result, an equalizer is required at the receiver to equalize the received signal by using such as, but not limited to decision feedback equalization mechanism. However, common equalization technologies usually have complex designs that result in higher hardware cost and affects the speed.

SUMMARY OF THE INVENTION

In consideration of the problem of the prior art, an object of the present invention is to provide a received data equalization apparatus and a received data equalization method.

The present invention discloses a received data equalization apparatus that includes a delay-compensating calculation circuit and a receive data equalization circuit. The delay-compensating calculation circuit is configured to retrieve a plurality of training data groups of a training data signal, wherein each of the training data groups includes an identical number of a plurality of pieces of training data each having a training data content and each corresponding to one of a plurality of compensation amounts, and to retrieve a total delay amount of each of the training data groups. The delay-compensating calculation circuit is further configured to, for each of the training data groups, determine a sign of each of the compensation amounts according to the relation among the training data content of each of the pieces of the training data to generate a plurality of signed compensation amounts and further generate a total compensation amount according to a sum of the signed compensation amounts and for each of the training data groups, solve an equation that makes the total delay amount correspond to the total compensation amount to obtain each of the compensation amounts. The receive data equalization circuit configured to receive the compensation amounts from the delay-compensating calculation circuit, retrieve a received data group in a received data signal, wherein the received data group includes a plurality of pieces of received data each having a received data content and each corresponding to one of the compensation amounts, determine a sign of each of the compensation amounts according to the relation among the received data content of each of the pieces of the received data to generate a plurality of signed received compensation amounts and further generate a total received compensation amount according to a sum of the signed received compensation amounts and perform equalization on a terminal edge of the receive data group according to the total receive compensation amount.

The present invention also discloses a received data equalization method that includes the steps outlined below. A plurality of training data groups of a training data signal are retrieved by a delay-compensating calculation circuit, wherein each of the training data groups includes an identical number of a plurality of pieces of training data each having a training data content and each corresponding to one of a plurality of compensation amounts. A total delay amount of each of the training data groups is retrieved by the delay-compensating calculation circuit. For each of the training data groups, a sign of each of the compensation amounts is determined by the delay-compensating calculation circuit according to the relation among the training data content of each of the pieces of the training data to generate a plurality of signed compensation amounts and further generate a total compensation amount according to a sum of the signed compensation amounts. For each of the training data groups, an equation that makes the total delay amount correspond to the total compensation amount is solved by the delay-compensating calculation circuit to obtain each of the compensation amounts. The compensation amounts are received from the delay-compensating calculation circuit by a received data equalization circuit. A received data group in a received data signal is retrieved by the received data equalization circuit, wherein the received data group includes a plurality of pieces of received data each having a received data content and each corresponding to one of the compensation amounts. A sign of each of the compensation amounts is determined by the received data equalization circuit according to the relation among the received data content of each of the pieces of the received data to generate a plurality of signed received compensation amounts and further generate a total received compensation amount according to a sum of the signed received compensation amounts. Equalization is performed on a terminal edge of the receive data group by the received data equalization circuit according to the total receive compensation amount.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a received data equalization apparatus and a received data equalization method to calculate compensation amounts by using a delay-compensating calculation circuit and further calculate a total compensation amount based on the relation among the received data content of the received data such that the inter-symbol interference can be calibrated with a method that is easy to converge and has a short convergence time.

Figure 1:
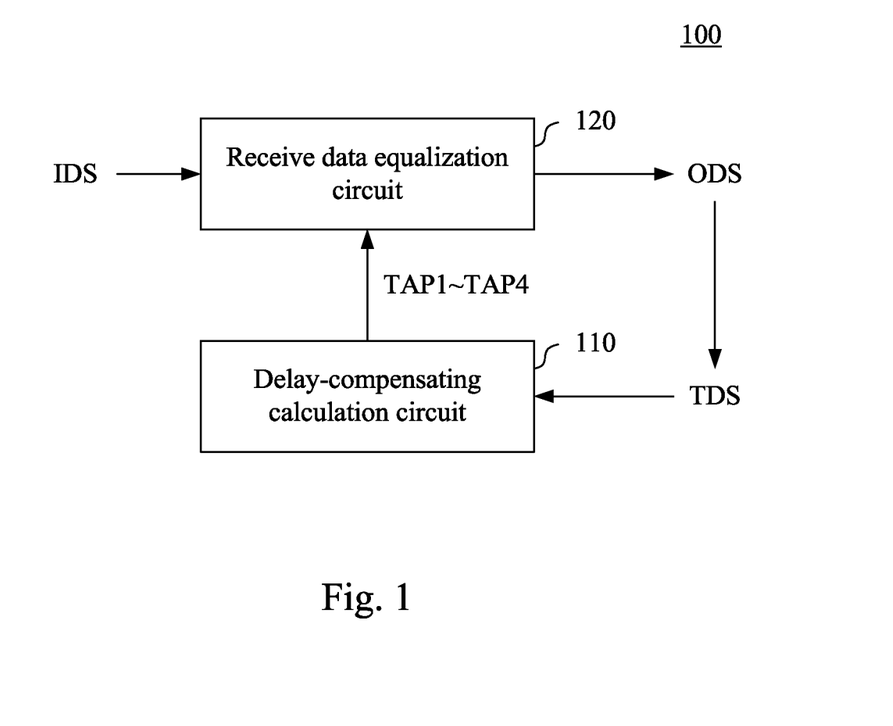
FIG. 1 illustrates a block diagram of a received data equalization apparatus according to an embodiment of the present invention.

Reference is now made to FIG. 1. FIG. 1 illustrates a block diagram of a received data equalization apparatus 100 according to an embodiment of the present invention.

In an embodiment, the received data equalization apparatus 100 is disposed in a receiver (RX) of a communication system, and is configured to perform equalization on a received data signal IDS and generate an output data signal ODS to lower the inter-symbol interference of the received data signal IDS.

The received data equalization apparatus 100 includes a delay-compensating calculation circuit 110 and a received data equalization circuit 120.

The delay-compensating calculation circuit 110 is configured to receive a training data signal TDS and generate a plurality of compensation amounts TAP1~TAP4 according to the training data signal TDS. The operation mechanism of the delay-compensating calculation circuit 110 is described in detail in the following paragraphs in accompany with FIG. 2.

Figure 2:
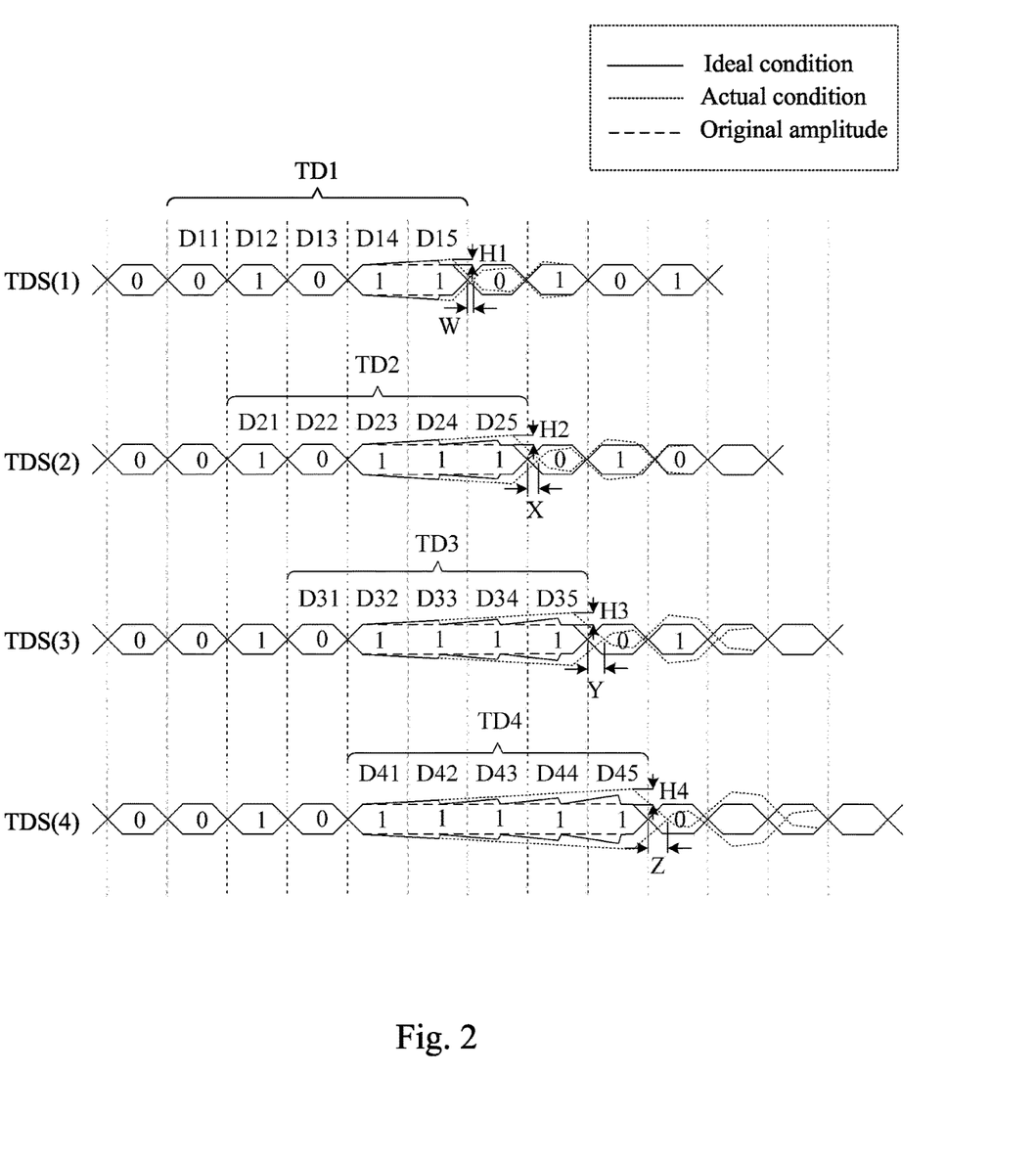
FIG. 2 illustrates a diagram of the training data signal at different time points according to an embodiment of the present invention.

FIG. 2 illustrates a diagram of the training data signal TDS at different time points according to an embodiment of the present invention. The training data signal TDS at the different time points are distinguished as TDS(1), TDS(2), TDS(3) and TDS(4) in FIG. 2.

The delay-compensating calculation circuit 110 is configured to retrieve a plurality of training data groups TD1~TD4 of the training data signal TDS. Each of the training data groups TD1~TD4 includes the identical number of a plurality of pieces of training data each having a training data content. The training data content is one of a piece of high state data (labeled as 1) and a piece of low state data (labeled as 0).

In an example, the training data group TD1 includes training data D11~D15 arranged in series that have the training data contents of 0, 1, 0, 1 and 1. The training data group TD2 includes training data D21~D25 arranged in series that have the training data contents of 1, 0, 1, 1 and 1. The training data group TD3 includes training data D31~D35 arranged in series that have the training data contents of 0, 1, 1, 1 and 1. The training data group TD4 includes training data D41~D45 arranged in series that have the training data contents of 1, 1, 1, 1 and 1.

In a training data group, a piece of non-final training data has an effect on a piece of final training data. When two or more than two consecutive 1s or 0s are presented in the data contents, the inter-symbol interference occurs such that the data length is increased and the terminal time point of the data group is delayed. The edge of the final training data is therefore delayed and extrudes the edge of subsequent data. When more consecutive 1s or 0s are presented in the data contents of the training data groups, a more severe effect occurs. However, when 1s and 0s appear in an interlaced manner, the effect of 1s and the effect of 0s cancel out each other.

Take FIG. 2 as an example, when the consecutive and repeated data contents (e.g. 1s) are presented, the solid-line waveform corresponds to the ideal condition that the inter-symbol interference does not occur. The dotted-line waveform corresponds to the actual condition that the inter-symbol interference accumulates along with the multiple data contents. The distance between the dashed-lines corresponds to the amount of the original amplitude of the data contents.

The delay-compensating calculation circuit 110 is configured to retrieve a total delay amount of each of the training data groups TD1~TD4. The total delay amount is the delay amount caused by the training data of each of the training data groups TD1~TD4 on the data subsequent to the training data groups TD1~TD4, in which the value of the total delay amount is the sum of the value of the individual delay amount of each of the training data in the training data group.

As illustrated in FIG. 2, in an embodiment, the total delay amount is generated according to a difference value between an actual terminal edge (corresponding to the dotted-line waveform) and an ideal terminal edge (corresponding to the solid-line waveform) of the final training data (i.e., the training data D15, D25, D35 and D45) of each of the training data groups TD1~TD4. The total delay amount of each of the training data groups TD1~TD4 is represented as W, X, Y and Z. The ideal terminal edges are aligned to the vertical dashed lines in FIG. 2.

For example, the inter-symbol interference accumulated due to the two consecutive 1s in the training data groups TD1 makes the actual terminal edge of the second 1 (corresponding to the training data D15) distances from the ideal terminal edge by the total delay amount W, and makes the amplitude of the second 1 not only higher than the first 1 (corresponding to the training data D14), but also distances a difference H1 from the original amplitude. The difference H1 is proportional to the total delay amount W.

Based on the same rationale, the inter-symbol interference accumulated due to the three consecutive 1s in the training data groups TD2 makes the actual terminal edge of the third 1 (corresponding to the training data D25) distances from the ideal terminal edge by the total delay amount X, and makes the amplitude of the third 1 not only higher than the previous two 1s (corresponding to the training data D24 and D23), but also distances a difference H2 from the original amplitude. The difference H2 is proportional to the total delay amount X.

The inter-symbol interference accumulated due to the four consecutive 1s in the training data groups TD3 makes the actual terminal edge of the fourth 1 (corresponding to the training data D35) distances from the ideal terminal edge by the total delay amount Y, and makes the amplitude of the fourth 1 not only higher than the previous three 1s (corresponding to the training data D32~D34), but also distances a difference H3 from the original amplitude. The difference H3 is proportional to the total delay amount Y.

The inter-symbol interference accumulated due to the five consecutive 1s in the training data groups TD4 makes the actual terminal edge of the fifth 1 (corresponding to the training data D45) distances from the ideal terminal edge by the total delay amount Z, and makes the amplitude of the fifth 1 not only higher than the previous four 1s (corresponding to the training data D41~D44), but also distances a difference H4 from the original amplitude. The difference H4 is proportional to the total delay amount Z.

It is appreciated that the measurement of the total delay amounts W~Z can be generated by the delay-compensating calculation circuit 110 by using statistics and averaging. More specifically, take the total delay amount W as an example, when the delay-compensating calculation circuit 110 keeps receiving the training data signal TDS such that the training data group TD1 appears a multiple of times, the delay-compensating calculation circuit 110 records the total delay amount W accumulated by the training data group TD1 every time the training data group TD1 appears. When a certain times of the appearance of the training data group TD1 is reached, an average is performed by all the total delay amounts generated by the appearance of the training data group TD1 to serve as the latest value of the total delay amount W corresponding to the training data group TD1. The total delay amounts X~Z can be generated by using the same method. The detail is therefore not described herein.

In an embodiment, each of the training data of each of the training data groups TD1~TD4 corresponds to one of the compensation amounts, and the compensation amounts are used to compensate the delay amount caused by the training data. The delay amount caused by each of the training data is the effect generated by the non-final training data on the final training data.

As a result, the compensation amount of each of the final training data D15~D45 (i.e., the training data D15, D25, D35 and D45) is 0. Each of the non-final training data D11~D41 (i.e., the training data D11, D21, D31 and D41) corresponds to the compensation amount TAP4. Each of the non-final training data D12~D42 (i.e., the training data D12, D22, D32, D42) corresponds to the compensation amount TAP3. Each of the non-final training data D13~D43 (i.e., training data D13, D23, D33, D43) corresponds to the compensation amount TAP2. Each of the non-final training data D14~D44 (i.e., training data D14, D24, D34, D44) corresponds to the compensation amount TAP1.

For each of the training data groups TD1~TD4, the delay-compensating calculation circuit 110 determines a sign of each of the compensation amounts TAP1~TAP4 according to the relation among the training data content of each of the training data to generate a plurality of signed compensation amounts and further generate a total compensation amount according to a sum of the signed compensation amounts.

In an embodiment, when the training data content of one of the non-final training data of the training data and the training data content of the final training data have opposite states, the delay-compensating calculation circuit 110 assigns a positive sign to one of the signed compensation amounts that corresponds to the non-final training data. When the training data content of the non-final training data of the training data and the training data content of the final training data have the same state, the delay-compensating calculation circuit 110 assigns a negative sign to one of the signed compensation amounts that corresponds to the non-final training data. Further, the delay-compensating calculation circuit 110 assigns 0 to one of the signed compensation amounts that corresponds to the final training data.

For the training data group TD1, the training data contents of the non-final training data D11~D14 (0, 1, 0, 1) in turn have the opposite state, the same state, the opposite state and the same state relative to the training data content of the final training data D15 (1). As a result, the delay-compensating calculation circuit 110 in turn generates the signed compensation amounts of +TAP4, −TAP3, +TAP2 and −TAP1.

Since the compensation amount of the final training data D15 is 0, the signed compensation amount thereof is also 0. The delay-compensating calculation circuit 110 further generates the total compensation amount TC1 according to the sum of the signed compensation amounts described above, i.e., TC1=+TAP4−TAP3+TAP2−TAP1.

For the training data group TD2, the training data contents of the non-final training data D21~D24 (1, 0, 1, 1) in turn have the same state, the opposite state, the same state and the same state relative to the training data content of the final training data D25 (1). The signed compensation amount of the final training data D25 is 0. The delay-compensating calculation circuit 110 therefore generates the total compensation amount TC2=−TAP4+TAP3−TAP2−TAP1.

For the training data group TD3, the training data contents of the non-final training data D31~D34 (0, 1, 1, 1) in turn have the opposite state, the same state, the same state and the same state relative to the training data content of the final training data D35 (1). The signed compensation amount of the final training data D35 is 0. The delay-compensating calculation circuit 110 therefore generates the total compensation amount TC3=+TAP4−TAP3−TAP2−TAP1.

For the training data group TD4, the training data contents of the non-final training data D41~D44 (1, 1, 1, 1) in turn have the same state, the same state, the same state and the same state relative to the training data content of the final training data D45 (1). The signed compensation amount of the final training data D45 is 0. The delay-compensating calculation circuit 110 therefore generates the total compensation amount TC4=−TAP4−TAP3−TAP2−TAP1.

The delay-compensating calculation circuit 110 solves equations that make the total delay amounts W~Z correspond to the total compensation amounts TC1, TC2, TC3 and TC4 to obtain each of the compensation amounts TAP1~TAP4.

Since the total compensation amounts TC1, TC2, TC3 and TC4 are used to compensate the total delay amounts W~Z, the signs of the total compensation amounts and the total delay amounts are opposite. The corresponding four equations are illustrated below:

$$TC1=+TAP4-TAP3+TAP2-TAP1=-W \quad \text{(equation 1)}$$

$$TC2=-TAP4+TAP3-TAP2-TAP1=-X \quad \text{(equation 2)}$$

$$TC3=+TAP4-TAP3-TAP2-TAP1=-Y \quad \text{(equation 3)}$$

$$TC4=-TAP4-TAP3-TAP2-TAP1=-Z \quad \text{(equation 4)}$$

Based on the four equations described above, the delay-compensating calculation circuit 110 can solve the equations to generate the compensation amounts TAP1~TAP4 that are expressed as the following four equations:

$$TAP1=(W+X)/2 \quad \text{(equation 5)}$$

$$TAP2=(Y-W)/2 \quad \text{(equation 6)}$$

$$TAP3=(Z-X)/2 \quad \text{(equation 7)}$$

$$TAP4=(Z-Y)/2 \quad \text{(equation 8)}$$

The received data equalization circuit 120 is configured to receive the compensation amounts TAP1~TAP4 from the delay-compensating calculation circuit 110 and perform equalization on the received data signal IDS according to the compensation amounts TAP1~TAP4.

For example, for the training data group TD1, since the difference H1 is proportional to the total delay amount W, the received data equalization circuit 120 may suppress the difference H1 according to the compensation amount TAP1 to further minimize the total delay amount W when a pattern corresponding to the training data group TD1, e.g. 0110, appears in the data content. Identically, when the patterns corresponding to other training data groups appear, the received data equalization circuit 120 can perform adjustment according to the combination of the compensation amounts TAP1~TAP4 to minimize the total delay amount.

Figure 3:
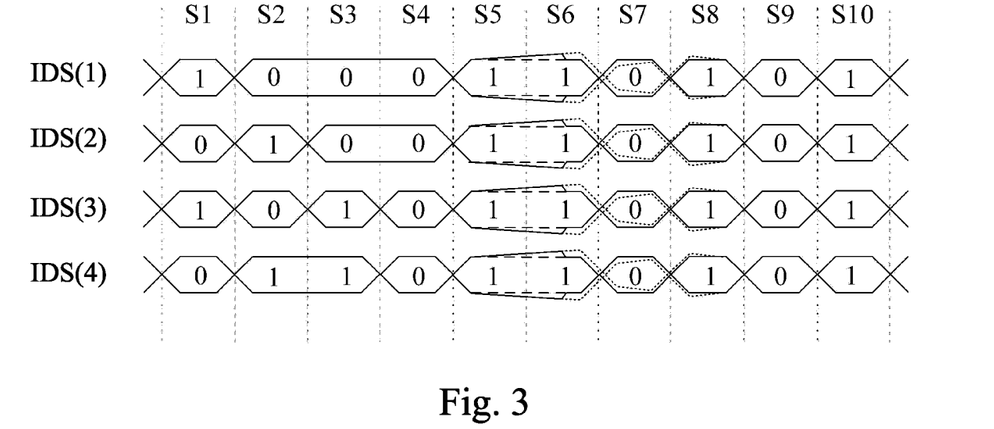
FIG. 3 illustrates a diagram of the received data signal at different time points according to an embodiment of the present invention.

The operation mechanism of the received data equalization circuit 120 is described in detail in accompany with FIG. 3.

FIG. 3 illustrates a diagram of the received data signal IDS at different time points according to an embodiment of the present invention. The received data signal IDS at the different time points are distinguished as IDS(1), IDS(2), IDS(3) and IDS(4) in FIG. 3. A plurality of pieces of data included in the received data signal IDS are distinguished by the time slots S1-S10.

The received data equalization circuit 120 is configured to retrieve a received data group in the received data signal IDS, wherein the received data group includes a plurality of pieces of received data each having a received data content and each corresponding to one of the compensation amounts TAP1~TAP4.

The received data equalization circuit 120 further determines a sign of each of the compensation amounts TAP1~TAP4 according to the relation among the received data content of each of the pieces of the received data to generate a plurality of signed received compensation amounts and further generate a total received compensation amount according to a sum of the signed received compensation amounts.

When the received data content of the non-final received data of the received data and the received data content of the final received data have opposite states, the received data equalization circuit 120 assigns a positive sign to one of the signed received compensation amounts that corresponds to the non-final received data. When the received data content of the non-final received data of the received data and the received data content of the final received data have the same state, the received data equalization circuit 120 assigns a negative sign to one of the signed received compensation amounts that corresponds to the non-final received data. Further, the received data equalization circuit 120 assigns 0 to one of the signed received compensation amounts that corresponds to the final received data.

For the received data group corresponding to the time slots S2~S6 in the received data signal IDS(1), the received data has the received data contents of 0, 0, 0, 1 and 1. The received data content of the non-final received data (0, 0, 0, 1) in turn have the opposite state, the opposite state, the opposite state and the same state relative to the received data content of the non-final received data (1). As a result, the received data equalization circuit 120 in turn generates the signed received compensation amounts of +TAP4, +TAP3, +TAP2 and −TAP1, and further generates the total received compensation amount as +TAP4+TAP3+TAP2−TAP1 based of the sum of the signed received compensation amounts. According to equations 5~8, the total received compensation amount becomes $[+(Z-Y)+(Z-X)+(Y-W)-(W+X)]/2=-W+(Z-X)$.

Identically, for the received data group corresponding to the time slots S2~S6 in the received data signal IDS(2), the received data equalization circuit 120 generates the total received compensation amount as −TAP4+TAP3+TAP2−TAP1, and further obtains the result of $[-(Z-Y)+(Z-X)+(Y-W)-(W+X)]/2=-W+(Y-X)$ according to the calculation based on the equations 5-8.

For the received data group corresponding to the time slots S2~S6 in the received data signal IDS(3), the received data equalization circuit 120 generates the total received compensation amount as +TAP4−TAP3+TAP2−TAP1, and further obtains the result of $[+(Z-Y)-(Z-X)+(Y-W)-(W+X)]/2=-W$ according to the calculation based on the equations 5~8. For the received data group corresponding to the time slots S2-S6 in the received data signal IDS(4), the received data equalization circuit 120 generates the total received compensation amount as −TAP4−TAP3+TAP2−TAP1, and further obtains the result of $[-(Z-Y)-(Z-X)+(Y-W)-(W+X)]/2=-W-(Z-Y)$ according to the calculation based on the equations 5-8.

Besides, for the received data group corresponding to the time slots S3~S7 in the received data signal IDS(1), the received data equalization circuit 120 generates the total received compensation amount as −TAP4−TAP3+TAP2+TAP1, and further obtains the result of $[-(Z-Y)-(Z-X)+(Y-W)+(W+X)]/2=X-(Z-Y)$ according to the calculation based on the equations 5~8. For the received data group corresponding to the time slots S3-S7 in the received data signal IDS(3), the received data equalization circuit 120 generates the total received compensation amount as +TAP4−TAP3+TAP2+TAP1, and further obtains the result of $[+(Z-Y)-(Z-X)+(Y-W)+(W+X)]/2=X$ according to the calculation based on the equations 5-8.

For the received data group corresponding to the time slots S4-S8 in the received data signal IDS(1), the received data equalization circuit 120 generates the total received compensation amount as +TAP4−TAP3−TAP2+TAP1, and further obtains the result of $[+(Z-Y)-(Z-X)-(Y-W)+(W+X)]/2=W-(Y-X)$ according to the calculation based on the equations 5-8. For the received data group corresponding to the time slots S5-S9 in the received data signal IDS(1), the received data equalization circuit 120 generates the total received compensation amount as +TAP4+TAP3−TAP2+TAP1, and further obtains the result of $[+(Z-Y)+(Z-X)-(Y-W)+(W+X)]/2=W+(Z-Y)$ according to the calculation based on the equations 5-8. For the received data group corresponding to the time slots S6-S10 in the received data signal IDS(1), the received data equalization circuit 120 generates the total received compensation amount as −TAP4+TAP3−TAP2+TAP1, and further obtains the result of $[-(Z-Y)+(Z-X)-(Y-W)+(W+X)]/2=W$ according to the calculation based on the equations 5-8.

Figure 4:
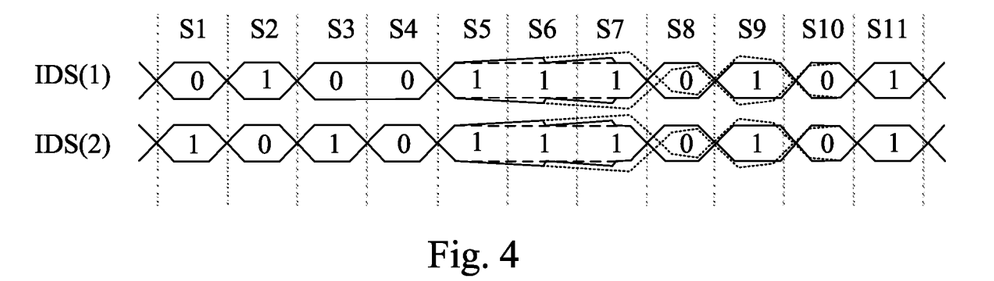
FIG. 4 illustrates a diagram of the received data signal at different time points according to another embodiment of the present invention.

FIG. 4 illustrates a diagram of the received data signal IDS at different time points according to another embodiment of the present invention. The received data signal IDS at the different time points are distinguished as IDS(1) and IDS(2) in FIG. 4. A plurality of pieces of data included in the received data signal IDS are distinguished by the time slots S1-S11.

For the received data group corresponding to the time slots S3-S7 in the received data signal IDS(1), the received data equalization circuit 120 generates the total received compensation amount as +TAP4+TAP3−TAP2−TAP1, and further obtains the result of $[+(Z-Y)+(Z-X)-(Y-W)-(W+X)]/2=-X+(Z-Y)$ according to the calculation based on the equations 5~8. For the received data group corresponding to the time slots S3-S7 in the received data signal IDS(2), the received data equalization circuit 120 generates the total received compensation amount as −TAP4+TAP3−TAP2−

TAP1, and further obtains the result of $[-(Z-Y)+(Z-X)-(Y-W)-(W+X)]/2=-X$ according to the calculation based on the equations 5~8.

For the received data group corresponding to the time slots S4-S8 in the received data signal IDS(1), the received data equalization circuit 120 generates the total received compensation amount as $-TAP4+TAP3+TAP2+TAP1$, and further obtains the result of $[-(Z-Y)+(Z-X)+(Y-W)+(W+X)]/2=Y$ according to the calculation based on the equations 5~8. For the received data group corresponding to the time slots S5-S9 in the received data signal IDS(1), the received data equalization circuit 120 generates the total received compensation amount as $-TAP4-TAP3-TAP2+TAP1$, and further obtains the result of $[-(Z-Y)-(Z-X)-(Y-W)+(W+X)]/2=W-(Z-X)$ according to the calculation based on the equations 5-8. For the received data group corresponding to the time slots S6-S10 in the received data signal IDS(1), the received data equalization circuit 120 generates the total received compensation amount as $+TAP4+TAP3-TAP2+TAP1$, and further obtains the result of $[+(Z-Y)+(Z-X)-(Y-W)+(W+X)]/2=W+(Z-Y)$ according to the calculation based on the equations 5-8. For the received data group corresponding to the time slots S7-S11 in the received data signal IDS(1), the received data equalization circuit 120 generates the total received compensation amount as $-TAP4+TAP3-TAP2+TAP1$, and further obtains the result of $[-(Z-Y)+(Z-X)-(Y-W)+(W+X)]/2=W$ according to the calculation based on the equations 5-8.

Figure 5:
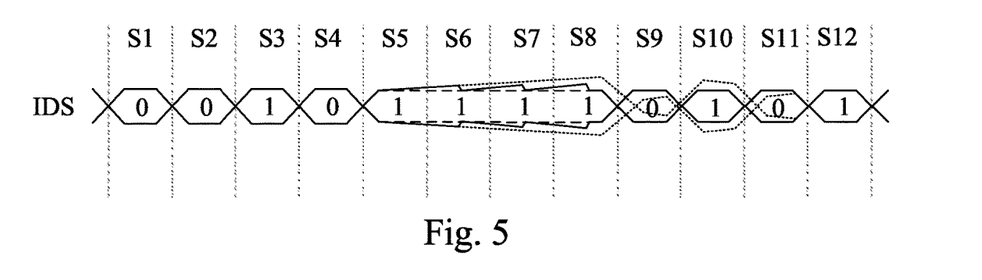
FIG. 5 illustrates a diagram of the received data signal at different time points according to yet another embodiment of the present invention.

FIG. 5 illustrates a diagram of the received data signal IDS at different time points according to yet another embodiment of the present invention. A plurality of pieces of data included in the received data signal IDS are distinguished by the time slots S1-S12.

For the received data group corresponding to the time slots S4-S8 in the received data signal IDS, the received data equalization circuit 120 generates the total received compensation amount as $+TAP4-TAP3-TAP2-TAP1$, and further obtains the result of $[+(Z-Y)-(Z-X)-(Y-W)-(W+X)]/2=-Y$ according to the calculation based on the equations 5-8. For the received data group corresponding to the time slots S5~S9 in the received data signal IDS, the received data equalization circuit 120 generates the total received compensation amount as $+TAP4+TAP3+TAP2+TAP1$, and further obtains the result of $[(Z-Y)+(Z-X)+(Y-W)+(W+X)]/2=Z$ according to the calculation based on the equations 5-8. For the received data group corresponding to the time slots S6-S10 in the received data signal IDS, the received data equalization circuit 120 generates the total received compensation amount as $-TAP4-TAP3-TAP2+TAP1$, and further obtains the result of $[-(Z-Y)-(Z-X)-(Y-W)+(W+X)]/2=W-(Z-X)$ according to the calculation based on the equations 5-8.

For the received data group corresponding to the time slots S7-S11 in the received data signal IDS, the received data equalization circuit 120 generates the total received compensation amount as $+TAP4+TAP3+TAP2+TAP1$, and further obtains the result of $[+(Z-Y)+(Z-X)-(Y-W)+(W+X)]/2=W+(Z-Y)$ according to the calculation based on the equations 5-8. For the received data group corresponding to the time slots S8-S12 in the received data signal IDS, the received data equalization circuit 120 generates the total received compensation amount as $-TAP4+TAP3-TAP2+TAP1$, and further obtains the result of $[-(Z-Y)+(Z-X)-(Y-W)+(W+X)]/2=W$ according to the calculation based on the equations 5-8.

Figure 6:
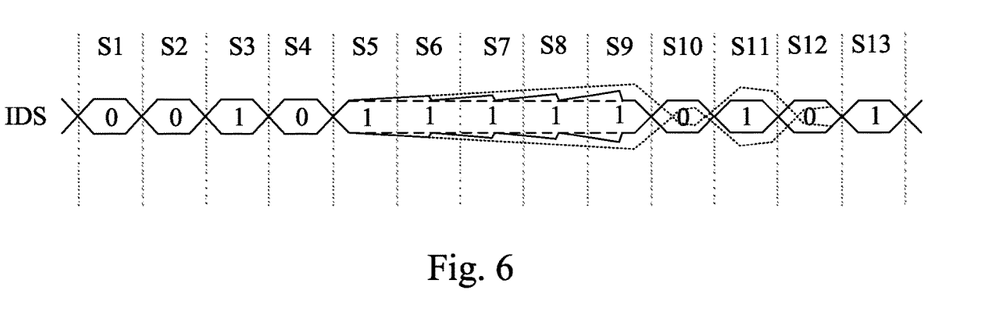
FIG. 6 illustrates a diagram of the received data signal at different time points according to still another embodiment of the present invention.

FIG. 6 illustrates a diagram of the received data signal IDS at different time points according to still another embodiment of the present invention. A plurality of pieces of data included in the received data signal IDS are distinguished by the time slots S1-S13.

For the received data group corresponding to the time slots S5-S9 in the received data signal IDS, the received data equalization circuit 120 generates the total received compensation amount as $-TAP4-TAP3-TAP2-TAP1$, and further obtains the result of $[-(Z-Y)-(Z-X)-(Y-W)-(W+X)]/2=-Z$ according to the calculation based on the equations 5-8. For the received data group corresponding to the time slots S6-S10 in the received data signal IDS, the received data equalization circuit 120 generates the total received compensation amount as $+TAP4+TAP3+TAP2+TAP1$, and further obtains the result of $[+(Z-Y)+(Z-X)+(Y-W)+(W+X)]/2=Z$ according to the calculation based on the equations 5-8. For the received data group corresponding to the time slots S7-S11 in the received data signal IDS, the received data equalization circuit 120 generates the total received compensation amount as $-TAP4-TAP3-TAP2+TAP1$, and further obtains the result of $[-(Z-Y)-(Z-X)-(Y-W)+(W+X)]/2=W+X-Z$ according to the calculation based on the equations 5-8.

For the received data group corresponding to the time slots S8-S12 in the received data signal IDS, the received data equalization circuit 120 generates the total received compensation amount as $+TAP4+TAP3-TAP2+TAP1$, and further obtains the result of $[+(Z-Y)+(Z-X)-(Y-W)+(W+X)]/2=W+(Z-Y)$ according to the calculation based on the equations 5-8. For the received data group corresponding to the time slots S9-S13 in the received data signal IDS, the received data equalization circuit 120 generates the total received compensation amount as $-TAP4+TAP3-TAP2+TAP1$, and further obtains the result of $[-(Z-Y)+(Z-X)-(Y-W)+(W+X)]/2=W$ according to the calculation based on the equations 5-8.

The received data equalization circuit 120 performs equalization on a terminal edge of the receive data group according to the total receive compensation amount. The terminal edge of the received data group is the terminal edge of the final received data. More specifically, for the terminal edge of the final received data of each of the different received data groups, the received data equalization circuit 120 performs adjustment thereon according to the corresponding total compensation amount such that the actual terminal edge can be aligned with the ideal terminal edge.

In an embodiment, after the compensation amounts TAP1-TAP4 are received from the delay-compensating calculation circuit 110, the received data equalization circuit 120 performs the above-described calibration on the received data signal IDS to generate and transmit the output data signal ODS to the delay-compensating calculation circuit 110 as the training data signal TDS. The delay-compensating calculation circuit 110 further updates the compensation amounts TAP1~TAP4 according to the training data signal TDS.

By using the method described above, the received data equalization apparatus 100 can perform decision feedback equalization (DFE) on the received data IDS with a feedback mechanism.

In another embodiment, the delay-compensating calculation circuit 110 may also perform independent training according to the training data signal TDS under an offline condition and further transmit the compensation amounts TAP1-TAP4 obtained from the training to the received data equalization circuit 120 to perform calibration.

As a result, the received data equalization apparatus of the present invention can calculate compensation amounts by using a delay-compensating calculation circuit and further calculate a total compensation amount based on the relation among the received data content of the received data such that the inter-symbol interference can be calibrated with a method that is easy to converge and has a short convergence time.

Figure 7:
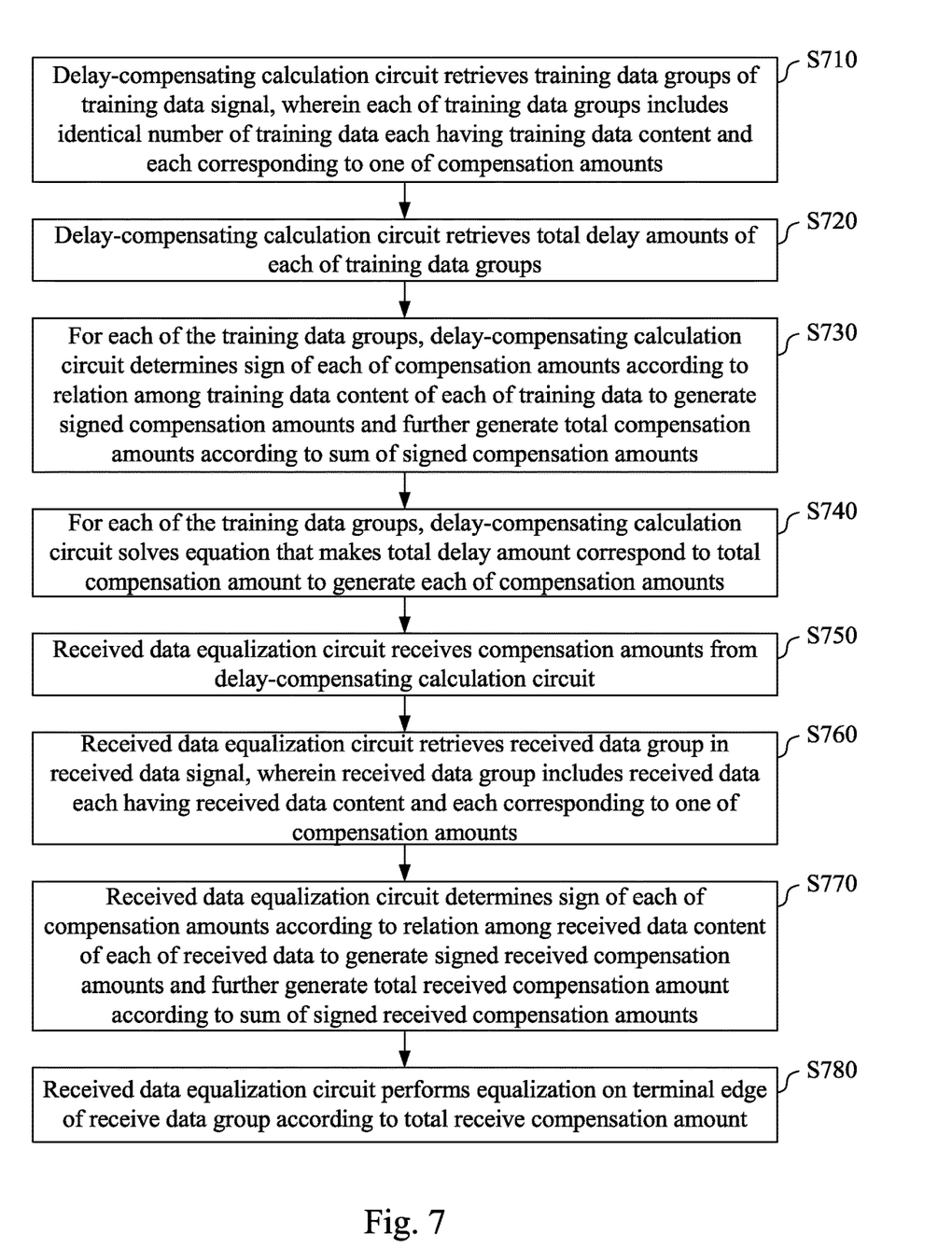
FIG. 7 illustrates a flow chart of a received data equalization method according to an embodiment of the present invention.

Reference is now made to FIG. 7. FIG. 7 illustrates a flow chart of a received data equalization method 700 according to an embodiment of the present invention.

Besides the apparatus described above, the present invention further discloses the received data equalization method 700 that can be used to manufacture such as, but not limited to the received data equalization apparatus 100 illustrated in FIG. 1. An embodiment of the received data equalization method 700 is illustrated in FIG. 7 and includes the steps outlined below.

In step S710, the training data groups TD1-TD4 of the training data signal TDS are retrieved by the delay-compensating calculation circuit 110, wherein each of the training data groups TD1-TD4 includes an identical number of the training data each having the training data content and each corresponding to one of the compensation amounts TAP1-TAP4.

In step S720, the total delay amounts W–Z of each of the training data groups TD1-TD4 is retrieved by the delay-compensating calculation circuit 110.

In step S730, for each of the training data groups TD1-TD4, a sign of each of the compensation amounts TAP1-TAP4 is determined by the delay-compensating calculation circuit 110 according to the relation among the training data content of each of the training data to generate the signed compensation amounts and further generate the total compensation amounts TC1-TC4 according to the sum of the signed compensation amounts.

In step S740, for each of the training data groups TD1-TD4, an equation that makes the total delay amount W–Z correspond to the total compensation amount TC1-TC4 is solved by the delay-compensating calculation circuit 110 to obtain each of the compensation amounts TAP1-TAP4.

In step S750, the compensation amounts TAP1-TAP4 are received from the delay-compensating calculation circuit 110 by the received data equalization circuit 120.

In step S760, the received data group in the received data signal IDS is retrieved by the received data equalization circuit 120, wherein the received data group includes the received data each having the received data content and each corresponding to one of the compensation amounts TAP1-TAP4.

In step S770, the sign of each of the compensation amounts TAP1-TAP4 is determined by the received data equalization circuit 120 according to the relation among the received data content of each of the received data to generate the signed received compensation amounts and further generate the total received compensation amount according to the sum of the signed received compensation amounts.

In step S780, equalization is performed on the terminal edge of the receive data group by the received data equalization circuit 120 according to the total receive compensation amount.

It is appreciated that the embodiments described above are merely an example. In other embodiments, it should be appreciated that many modifications and changes may be made by those of ordinary skill in the art without departing, from the spirit of the invention.

For example, the training data groups and the received data group each including five pieces of data are merely an example. In different application requirements, the training data groups may include any number of pieces of data that is two or larger than two, such that the delay-compensating calculation circuit can solve the relative equations to obtain the compensation amounts. The received data group may include the corresponding number of pieces of received data such that the received data equalization circuit performs equalization according to the compensation amounts.

Moreover, four training data groups are used as an example in the embodiments described above. However, in different application requirements, the delay-compensating calculation circuit can solve the equations related to different numbers of the training data groups to obtain the compensation amounts. Further, each of the training data of the training data groups does not necessarily include the patterns of the training data content described above. Under a proper selection, the delay-compensating calculation circuit can solve the equations related to the training data groups having the training data that includes different combinations of the training data content to obtain the compensation amounts.

In summary, the received data equalization apparatus and the received data equalization method of the present invention can calculate compensation amounts by using a delay-compensating calculation circuit and further calculate a total compensation amount based on the relation among the received data content of the received data such that the inter-symbol interference can be calibrated with a method that is easy to converge and has a short convergence time.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A received data equalization apparatus, comprising:
 a delay-compensating calculation circuit configured to:
  retrieve a plurality of training data groups of a training data signal, wherein each of the training data groups comprises an identical number of a plurality of pieces of training data each having a training data content and each corresponding to one of a plurality of compensation amounts;
  retrieve a total delay amount of each of the training data groups;
  for each of the training data groups, determine a sign of each of the compensation amounts according to the relation among the training data content of each of the pieces of the training data to generate a plurality of signed compensation amounts and further generate a total compensation amount according to a sum of the signed compensation amounts; and
  for each of the training data groups, solve an equation that makes the total delay amount correspond to the total compensation amount to obtain each of the compensation amounts; and
 a receive data equalization circuit configured to:
  receive the compensation amounts from the delay-compensating calculation circuit;
  retrieve a received data group in a received data signal, wherein the received data group comprises a plurality of pieces of received data each having a received data content and each corresponding to one of the compensation amounts;
  determine a sign of each of the compensation amounts according to the relation among the received data content of each of the pieces of the received data to generate a plurality of signed received compensation amounts and further generate a total received compensation amount according to a sum of the signed received compensation amounts; and perform equalization on a terminal edge of the receive data group according to the total receive compensation amount.

2. The received data equalization apparatus of claim 1, wherein the total delay amount is generated according to a difference value between an actual terminal edge and an ideal terminal edge of a piece of final training data of the training data of each of the training data groups.

3. The received data equalization apparatus of claim 2, wherein the training data content is one of a piece of high state data or a piece of low state data;

when the training data content of a piece of non-final training data of the training data and the training data content of the final training data have opposite states, the delay-compensating calculation circuit assigns a positive sign to one of the signed compensation amounts that corresponds to the non-final training data;

when the training data content of the non-final training data of the training data and the training data content of the final training data have the same state, the delay-compensating calculation circuit assigns a negative sign to one of the signed compensation amounts that corresponds to the non-final training data; and the delay-compensating calculation circuit assigns 0 to one of the signed compensation amounts that corresponds to the final training data.

4. The received data equalization apparatus of claim 1, wherein the received data content is one of a piece of high state data or a piece of low state data;

when the received data content of a piece of non-final received data of the received data and the received data content of a piece of final received data have opposite states, the received data equalization circuit assigns a positive sign to one of the signed received compensation amounts that corresponds to the non-final received data;

when the received data content of the non-final received data of the received data and the received data content of the final received data have the same state, the received data equalization circuit assigns a negative sign to one of the signed received compensation amounts that corresponds to the non-final received data; and the received data equalization circuit assigns 0 to one of the signed received compensation amounts that corresponds to the final received data.

5. The received data equalization apparatus of claim 1, wherein the received data equalization circuit transmits an output data signal generated according to an equalized received data signal to the delay-compensating calculation circuit as the training data signal.

6. A received data equalization method, comprising:

retrieving a plurality of training data groups of a training data signal by a delay-compensating calculation circuit, wherein each of the training data groups comprises an identical number of a plurality of pieces of training data each having a training data content and each corresponding to one of a plurality of compensation amounts;

retrieving a total delay amount of each of the training data groups by the delay-compensating calculation circuit;

for each of the training data groups, determining a sign of each of the compensation amounts by the delay-compensating calculation circuit according to the relation among the training data content of each of the pieces of the training data to generate a plurality of signed compensation amounts and further generate a total compensation amount according to a sum of the signed compensation amounts;

for each of the training data groups, solving an equation that makes the total delay amount correspond to the total compensation amount by the delay-compensating calculation circuit to obtain each of the compensation amounts;

receiving the compensation amounts from the delay-compensating calculation circuit by a received data equalization circuit;

retrieving a received data group in a received data signal by the received data equalization circuit, wherein the received data group comprises a plurality of pieces of received data each having a received data content and each corresponding to one of the compensation amounts;

determining a sign of each of the compensation amounts by the received data equalization circuit according to the relation among the received data content of each of the pieces of the received data to generate a plurality of signed received compensation amounts and further generate a total received compensation amount according to a sum of the signed received compensation amounts; and performing equalization on a terminal edge of the receive data group by the received data equalization circuit according to the total receive compensation amount.

7. The received data equalization method of claim 6, wherein the total delay amount is generated according to a difference value between an actual terminal edge and an ideal terminal edge of a piece of final training data of the training data of each of the training data groups.

8. The received data equalization method of claim 7, wherein the training data content is one of a piece of high state data or a piece of low state data, the received data equalization method further comprises:

when the training data content of a piece of non-final training data of the training data and the training data content of the final training data have opposite states, assigning a positive sign to one of the signed compensation amounts that corresponds to the non-final training data by the delay-compensating calculation circuit;

when the training data content of the non-final training data of the training data and the training data content of the final training data have the same state, assigning a negative sign to one of the signed compensation amounts that corresponds to the non-final training data by the delay-compensating calculation circuit; and assigning 0 to one of the signed compensation amounts that corresponds to the final training data by the delay-compensating calculation circuit.

9. The received data equalization method of claim 6, wherein the received data content is one of a piece of high state data or a piece of low state data, the received data equalization method further comprises:

when the received data content of a piece of non-final received data of the received data and the received data content of a piece of final received data have opposite states, assigning a positive sign to one of the signed received compensation amounts that corresponds to the non-final received data by the received data equalization circuit;

when the received data content of the non-final received data of the received data and the received data content of the final received data have the same state, assigning a negative sign to one of the signed received compensation amounts that corresponds to the non-final received data by the received data equalization circuit; and assigning 0 to one of the signed received compensation amounts that corresponds to the final received data by the received data equalization circuit.

10. The received data equalization method of claim 6, further comprising:

transmitting an output data signal generated according to an equalized received data signal to the delay-compensating calculation circuit as the training data signal by the received data equalization circuit.

\* \* \* \* \*